(12) United States Patent
Yang et al.

(10) Patent No.: US 6,827,067 B1
(45) Date of Patent: Dec. 7, 2004

(54) SYSTEM AND METHOD FOR INTERNAL EXHAUST GAS RECIRCULATION

(75) Inventors: Zhou Yang, South Windsor, CT (US); Brian Ruggiero, East Granby, CT (US); Shengqiang Huang, West Simsbury, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 10/660,508

(22) Filed: Sep. 12, 2003

Related U.S. Application Data

(60) Provisional application No. 60/409,981, filed on Sep. 12, 2002.

(51) Int. Cl.[7] ............................................. F02M 25/07
(52) U.S. Cl. .................................................. 123/568.14
(58) Field of Search ..................................... 123/568.14

(56) References Cited

U.S. PATENT DOCUMENTS

| | | | |
|---|---|---|---|
| 3,220,392 A | 11/1965 | Cummins | |
| 4,147,141 A | 4/1979 | Nagano | |
| 5,036,810 A | 8/1991 | Meneely | |
| 5,617,726 A | 4/1997 | Sheridan et al. | |
| 5,787,859 A | 8/1998 | Meistrick et al. | |
| 5,809,964 A | 9/1998 | Meistrick et al. | |
| 6,152,104 A | * 11/2000 | Vorih et al. | 123/568.14 |
| 6,170,474 B1 | * 1/2001 | Israel | 123/568.14 |
| 6,240,898 B1 | 6/2001 | Meistrick et al. | |
| 6,257,213 B1 | 7/2001 | Maeda | |
| 6,325,043 B1 | * 12/2001 | Meistrick et al. | 123/568.14 |
| 6,439,210 B1 | 8/2002 | Faletti et al. | |
| 6,594,996 B2 | 7/2003 | Yang | |
| 6,622,694 B2 | * 9/2003 | Mickiewicz et al. | 123/322 |
| 2003/0200954 A1 | * 10/2003 | Zsoldos et al. | 123/568.14 |

* cited by examiner

*Primary Examiner*—Henry C. Yuen
*Assistant Examiner*—Arnold Castro
(74) *Attorney, Agent, or Firm*—Collier Shannon Scott,PLLC

(57) ABSTRACT

A system and method for actuating one or more engine valves to produce one or more internal exhaust gas recirculation events is disclosed. The method of the present invention is a method of providing exhaust gas recirculation (EGR) in a multi-cylinder engine, each engine cylinder having at least one engine valve, intake and exhaust manifolds, and a valve actuator. The method comprises the steps of: imparting motion to the value actuator; actuating the engine valve of a first engine cylinder responsive to the imparted motion; determining a first and a second engine parameter level; modifying the imparted motion responsive to the level of the first engine parameter level and the second engine parameter level to produce an exhaust gas recirculation event.

18 Claims, 13 Drawing Sheets

SYSTEM AND METHOD FOR INTERNAL EXHAUST GAS RECIRCULATION

CROSS REFERENCE TO RELATED APPLICATION

This application relates to and claims priority on U.S. Provisional Patent Application No. 60/409,981 filed Sep. 12, 2002 and entitled "System and Method for Internal Exhaust Gas Recirculation," a copy of which is incorporated herein by reference in its entirety.

FIELD OF THE INVENTION

The present invention relates generally to a system and method for actuating one or more valves in an engine. In particular, the present invention relates to systems and methods for actuating one or more engine valves to produce an internal exhaust gas recirculation event. Embodiments of the present invention may provide internal exhaust gas recirculation in conjunction with main valve events (exhaust and/or intake), and with or without other auxiliary valve events, such as, for example, engine braking events.

BACKGROUND OF THE INVENTION

The basic principles of exhaust gas recirculation (EGR) are well known. After a properly operating engine has performed work on the combination of fuel and inlet air in its combustion chamber, the engine exhausts the remaining gas from the engine cylinder. An EGR system allows a portion of these exhaust gases to flow back into the engine cylinder. This recirculation of gases into the engine cylinder may be used during positive power operation, and/or during engine braking cycles to provide significant benefits.

During positive power operation, an EGR system is primarily used to improve engine emissions. During engine positive power, one or more intake valves may be opened to admit fuel and air from the atmosphere, which contains the oxygen required to burn the fuel in the cylinder. The air, however, also contains a large quantity of nitrogen. The high temperature found within the engine cylinder causes the nitrogen to react with any unused oxygen and form nitrogen oxides (NOx). Nitrogen oxides are one of the main pollutants emitted by diesel engines. The recirculated gases provided by an EGR system have already been used by the engine and contain only a small amount of oxygen. By mixing these gases with fresh air, the amount of oxygen entering the engine may be reduced and fewer nitrogen oxides may be formed. In addition, the recirculated gases may have the effect of lowering the combustion temperature in the engine cylinder below the point at which nitrogen combines with oxygen to form NOx. As a result, EGR systems may work to reduce the amount of NOx produced and to improve engine emissions. Current environmental standards for diesel engines, as well as proposed regulations, in the United States and other countries indicate that the need for improved emissions will only become more important in the future.

Generally, there are two types of EGR systems, internal and external. Many conventional EGR systems are external systems, which recirculate the gases from the exhaust manifold to the intake port through external piping. Many of these systems cause exhaust gas to recirculate through the external piping by opening a normally closed EGR control valve in the piping during the intake stroke.

For example, U.S. Pat. No. 5,617,726 (Apr. 8, 1997) to Sheridan et al. and assigned to Cummins Engine Co., Inc discloses an EGR system which includes an EGR line connecting the exhaust line and intake line of the engine, cooler means for cooling the recirculated portion of the exhaust gases, a bypass line for bypassing the cooler means, and valve means for directing the flow of the recirculated portion of the exhaust gases.

U.S. Pat. No. 4,147,141 (Apr. 3, 1979) to Nagano and assigned to Toyota discloses an EGR system which includes an EGR pipe for interconnecting an exhaust pipe and an intake pipe of an engine, an EGR cooler being positioned along the EGR pipe, a bypass pipe being arranged parallel to the EGR cooler, a selection valve for controlling the flow of exhaust gas through the cooler bypass, and an EGR valve mounted on the EGR pipe for controlling the flow of exhaust gas through the EGR pipe.

Many external EGR systems require several additional components, such as, external piping, bypass lines, and related cooling mechanisms, in order for the system to operate properly. These additional components, however, may significantly increase the cost of the vehicle, and may increase the space required for the system, creating packaging and manufacturing concerns. In addition, the combination of exhaust gas and moisture in the external piping may expedite the corrosion of system components, leading to reliability issues. Various embodiments of the present invention may be simpler, less expensive, and more reliable than many known external EGR systems that require these additional components.

Many conventional internal EGR systems provide EGR by taking exhaust gas into the combustion chamber through an open exhaust valve during the intake stroke. Without proper control, this technique may create performance problems due to the reduced amount of oxygen in the cylinder. Even though a satisfactory combustion situation may be obtained in the light-load operating range in which there is naturally an excess of air, problems may develop in the high-load operating ranges in which the proportion of air with respect to fuel is low (lean). These combustion conditions may create sub-optimal power and, in addition, may produce black smoke with large amounts of soot.

It is, therefore, desired to provide systems and methods for providing internal EGR events without the power and emissions problems associated with many conventional EGR systems. An advantage of various embodiments of the present invention is that they may provide the necessary control to avoid these pitfalls when actuating an exhaust valve during the intake stroke. In addition, various embodiments of the present invention may provide EGR by actuating one or more intake valves during the exhaust stroke.

An EGR system may also be used to optimize retarding power during engine braking operation by controlling the pressure and temperature in the exhaust manifold and engine cylinder. During engine braking, one or more exhaust valves may be selectively opened to convert, at least temporarily, the engine into an air compressor. In doing so, the engine develops retarding horsepower to help slow the vehicle down. This can provide the operator with increased control over the vehicle and substantially reduce wear on the service brakes of the vehicle. By controlling the pressure and temperature in the engine using EGR, the level of braking may be optimized at various operating conditions.

EGR may be provided with a compression release type engine brake and/or a bleeder brake. The operation of a compression-release type engine brake, or retarder, is well known. As a piston travels upward during its compression stroke, the gases that are trapped in the cylinder are compressed. The compressed gases oppose the upward motion of the piston. During engine braking operation, as the piston approaches the top dead center (TDC), at least one exhaust valve is opened to release the compressed gases in the cylinder to the exhaust manifold, preventing the energy stored in the compressed gases from being returned to the engine on the subsequent expansion down-stroke. In doing so, the engine develops retarding power to help slow the vehicle down. An example of a prior art compression release engine brake is provided by the disclosure of the Cummins, U.S. Pat. No. 3,220,392 (November 1965), which is incorporated herein by reference.

The operation of a bleeder type engine brake has also long been known. During engine braking, in addition to the normal exhaust valve lift, the exhaust valve(s) may be held slightly open continuously throughout the remaining engine cycle (full-cycle bleeder brake) or during a portion of the cycle (partial-cycle bleeder brake). The primary difference between a partial-cycle bleeder brake and a full-cycle bleeder brake is that the former does not have exhaust valve lift during most of the intake stroke. An example of a system and method utilizing a bleeder type engine brake is provided by the disclosure of Assignee's U.S. Pat. No. 6,594,996 (Jul. 22, 2003), a copy of which is incorporated herein by reference.

Many known EGR systems are not useful with existing engine brake systems. Many of these systems: (1) are incompatible with compression release brakes, bleeder brakes, or both; and/or (2) require significant modifications to the existing engine in order for the EGR and braking systems to work properly together. One advantage of various embodiments of the present invention is that they may be used in conjunction with compression release braking systems and/or bleeder braking systems, and require little or no modification to the existing engine in order for the two systems to operate properly.

An EGR system may incorporate additional features to improve performance. Embodiments of the present invention may incorporate, for example, valve catch devices, valve lift clipping mechanisms, EGR lash, selective hydraulic ratios, and reset mechanisms to improve the reliability and performance of the system.

Additional advantages of the invention are set forth, in part, in the description which follows and, in part, will be apparent to one of ordinary skill in the art from the description and/or from the practice of the invention.

SUMMARY OF THE INVENTION

Responsive to the foregoing challenges, Applicant has developed innovative systems and methods for actuating one or more engine valves. In one embodiment, the present invention is a method of providing exhaust gas recirculation (EGR) in a multi-cylinder engine. The method comprises the steps of: imparting motion to a valve actuator; actuating the engine valve of a first engine cylinder responsive to the imparted motion; determining a first and a second engine parameter level; modifying the imparted motion responsive to the level of the first engine parameter level and the second engine parameter level to produce an exhaust gas recirculation event.

Applicant has further developed an innovative system for providing exhaust gas recirculation (EGR) in a multi-cylinder engine having a housing. The system comprises: an EGR housing disposed on the engine housing, the EGR housing having an hydraulic passage formed therein; means for actuating the engine valve of a first engine cylinder; means for imparting motion to the valve actuation means; and means for modifying the motion imparted to said valve actuation means to produce an EGR event having an early valve closing time.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference numerals refer to like elements. The drawings are exemplary only, and should not be construed as limiting the invention.

DETAILED DESCRIPTION OF PREFERRED EMBODIMENTS OF THE INVENTION

Reference will now be made in detail to embodiments of the system and method of the present invention, examples of which are illustrated in the accompanying drawings. As embodied herein, the present invention includes systems and methods of controlling the actuation of engine valves.

Figure 1:
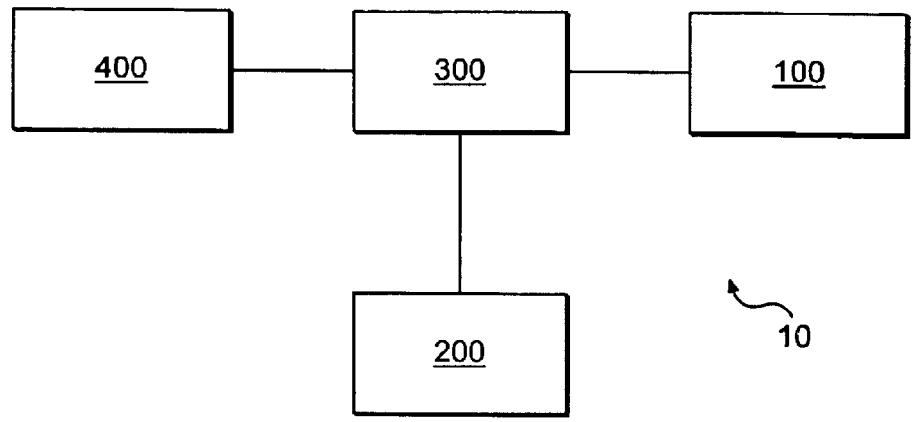
FIG. 1 is a schematic representation of a valve actuation system according to a first embodiment of the present invention.

A first embodiment of the present invention is shown schematically in FIG. 1 as valve actuation system 10. The valve actuation system 10 includes a means for imparting motion 100 operatively connected to a valve actuator 300, which in turn is operatively connected to one or more engine valves 200. The motion imparting means 100 is adapted to apply motion to the valve actuator 300. The valve actuator 300 may be selectively controlled to (1) transferring or (2) not transfer motion to the valves 200. The valve actuator 300 may also be adapted to modify the amount and timing of the motion transferred to the engine valves 200.

When operating in the motion transfer mode, the valve actuator 300 may actuate the engine valves 200 to produce an exhaust gas recirculation valve event. The valve actuator 300 may also actuate the engine valves 200 to produce other engine valve events, such as, but not limited to, main intake, main exhaust, compression release braking, and/or bleeder braking. The valve actuation system 10, including the valve actuator 300, may be switched between the modes of transferring motion and not transferring motion in response to a signal or input from a controller 400. The engine valves 200 may be one or more exhaust valves, intake valves, or auxiliary valves.

Figure 5:
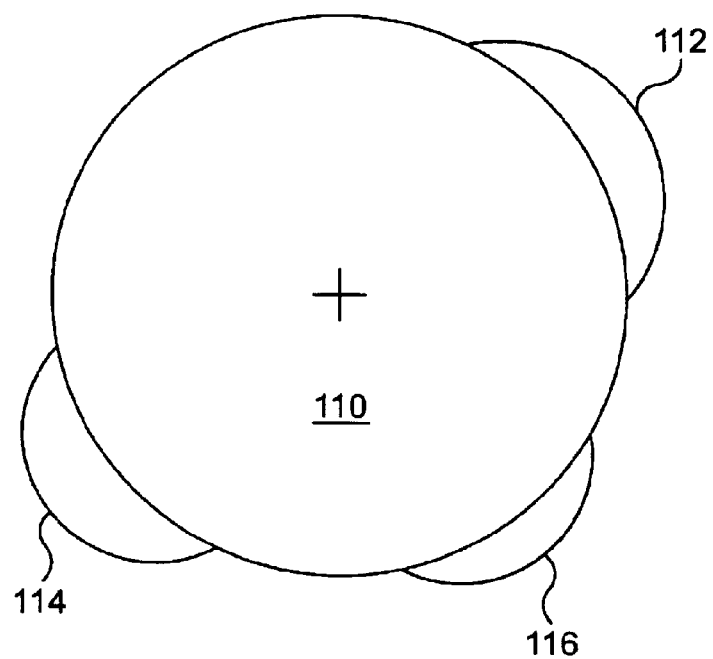
FIG. 5 is a cam that may be used in an embodiment of the present invention.

The motion imparting means 100 may comprise any combination of cam(s), push tube(s), and/or rocker arm(s), or their equivalents, adapted to impart motion to the valve actuator 300. In at least one embodiment of the present invention, the motion imparting means 100 comprises a cam 110. The cam 110 may comprise an exhaust cam, an intake cam, an injector cam, and/or a dedicated cam. The cam 110 may include one or more cam lobes for producing an engine valve event(s). With reference to FIG. 5, the cam 110 may include lobes, such as, for example, a main (exhaust or intake) event lobe 112, an engine braking lobe 114, and an EGR lobe 116. The depictions of the lobes on the cam 110 are intended to be illustrative only, and not limiting. It is appreciated that the number, combination, size, location, and shape of the lobes may vary markedly without departing from the intended scope of the present invention.

It is further appreciated that motion imparted by the cam 110 to produce an engine valve main event may be used to provide an EGR valve event. For example, a main event (e.g., intake or exhaust) lobe 112 may be used to additionally actuate one or more valves 200 for EGR valve event. Because the full motion of the main event may provide more valve lift than required for the EGR valve event, the motion may be modified by incorporating, for example, system lash, selective hydraulic ratios between components of the valve actuator 300, reset mechanisms, and/or valve lift clipping mechanisms.

The EGR valve event may be carried out by different valve(s) than those used to carry out the main engine valve event. These "different valves" may be of the same or different type (intake versus exhaust) as those used for the main valve event, and may be associated with a different or the same cylinder as the valves used for the main valve event.

The valve actuator 300 may comprise any structure that connects the motion imparting means 100 to the valves 200 and is capable of selectively transmitting motion from the motion imparting means 100 to actuate the valves 200. The valve actuator 300 may comprise, for example, a mechanical linkage, a hydraulic linkage, a hydro-mechanical linkage, an electromechanical linkage, an electromagnetic linkage, an air linkage, and/or any other linkage adapted to selectively transmit motion.

Figure 10:
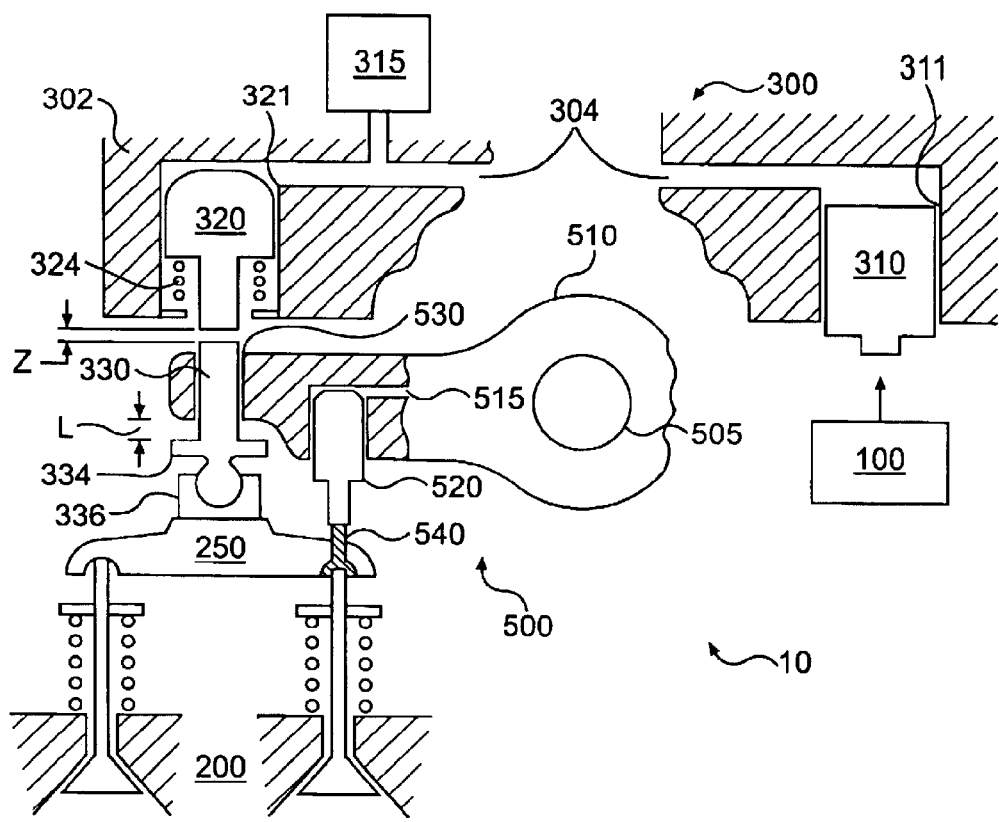
FIG. 10 is a valve actuation system according to a third embodiment of the present invention.

With reference to FIG. 10, when it incorporates a hydraulic circuit, the valve actuator 300 may include a master piston assembly 310 and a slave piston assembly 320. The valve actuator 300 may be operatively connected to means for supplying hydraulic fluid to and from the actuation means 300. The supply means may include means for adjusting the pressure of, or the amount of, fluid in the circuit, such as, for example, trigger valve(s), control valve (s), accumulator(s), check valve(s), fluid supply source(s), and/or other devices used to release hydraulic fluid from a circuit, add hydraulic fluid to a circuit, or control the flow of fluid in a circuit. The valve actuator 300 may be adapted for fixed timing (on/off) and/or variable timing. The valve actuator 300 may be located at any point in the valve train connecting the motion imparting means 100 and the valves 200.

The controller 400 may comprise any electronic or mechanical device for communicating with the valve actuator 300 and causing it to either transfer the motion input to it, or not transfer the motion, to the engine valves 200. The controller 400 may include a microprocessor, linked to other engine component(s), to determine and select the appropriate operation of the valve actuator 300. EGR may be achieved and optimized at a plurality of engine operating conditions (e.g., speeds, loads, etc.) by controlling the valve actuator 300 based upon information collected by the microprocessor from the engine component(s). The information collected may include, without limitation, engine speed, vehicle speed, oil temperature, manifold (or port) temperature, manifold (or port) pressure, cylinder temperature, cylinder pressure, particulate information, and/or crank angle.

The valve actuation system 10 may be used with any internal combustion engine. For example, the valve actuation system 10 may be used with a diesel engine, a gasoline engine, a dual fuel engine, and/or a natural gas engine. In one embodiment, as shown in FIG. 1, the valve actuation system 10 may be used with an engine that does not incorporate engine braking. Accordingly, the valve actuation system 10 may be used in conjunction with a stationary power generator, marine vehicles, agricultural vehicles and equipment, and/or any other system requiring EGR but not engine braking.

Figure 2:
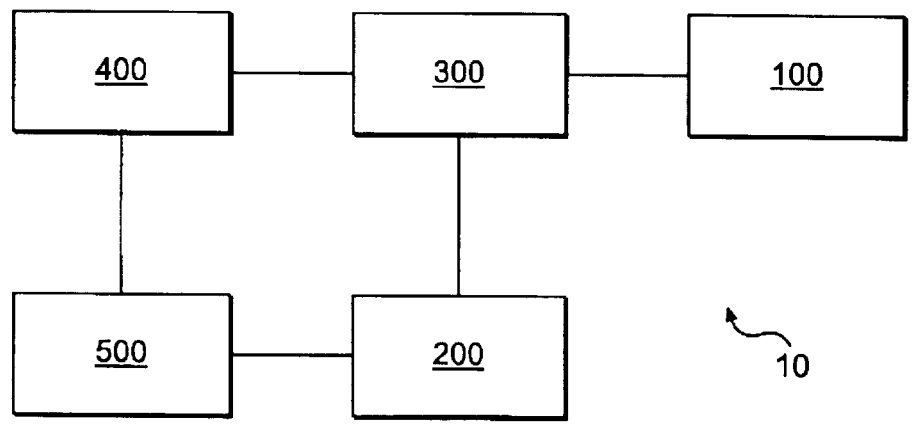
FIG. 2 is a schematic representation of a valve actuation system according to a second embodiment of the present invention.

In another embodiment of the present invention, the valve actuation system 10 is adapted to provide EGR valve events in conjunction with engine braking. The valve actuation system 10 may further comprise an engine braking system 500, as shown in FIG. 2. It is further contemplated that the valve actuator 300 may be adapted to provide engine braking in addition to providing EGR valve events.

Figure 3:
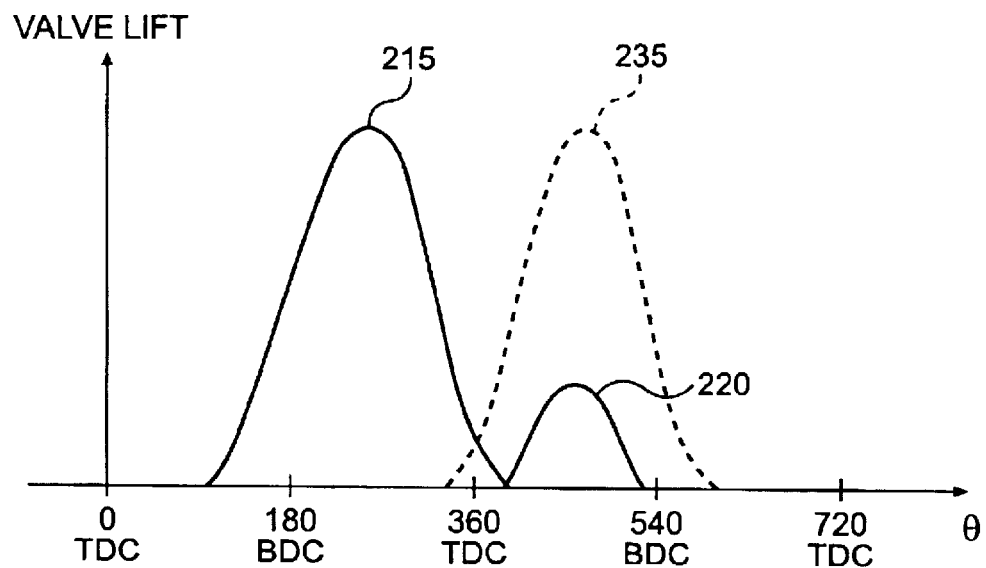
FIG. 3 is a valve lift profile according to an embodiment of the present invention illustrating actuation of one or more engine exhaust valves during the intake stroke.

In one embodiment of the present invention, the valve actuator 300 actuates one or more exhaust valves to produce an EGR event 220 during the main intake event 235, as shown in FIG. 3. A portion of the combustion gases that have been exhausted through the engine exhaust port are drawn back into the engine cylinder through the open exhaust valve by the pressure differential created by the downward movement of the piston in the engine cylinder during the intake stroke and a pressure pulse in the exhaust manifold. The recirculated gases are then combined with inlet air introduced into the engine cylinder during the intake main event.

The precise opening and closing times of the engine exhaust valve(s) (duration of the EGR event 220) are controlled by the controller 400 and may be determined based on the pressure differential across the exhaust valve (s). The controller 400 receives input from the appropriate engine component and inputs a signal to the valve actuator 300. In response to the signal, the valve actuator 300 may switch to the motion transfer mode and actuate the exhaust valve(s). The closing time for the valve may occur before the engine cylinder pressure is greater than the exhaust manifold pressure in order to prevent the recirculated gas from immediately escaping back into the exhaust manifold. The valve lift profile shown in FIG. 3 is for illustrative purposes only. As will be apparent to those of ordinary skill in the art, the size, shape, and timing of the EGR event 220 may vary depending on a variety of factors, including, but not limited to, the engine cylinder pressure, the exhaust manifold pressure, the lash between the valve actuator 300 and the valves 200, the relative sizes (or hydraulic ratio) between the various components of the valve actuator 300, and/or any other modification of the motion provided by the motion imparting means 100.

Figure 4:
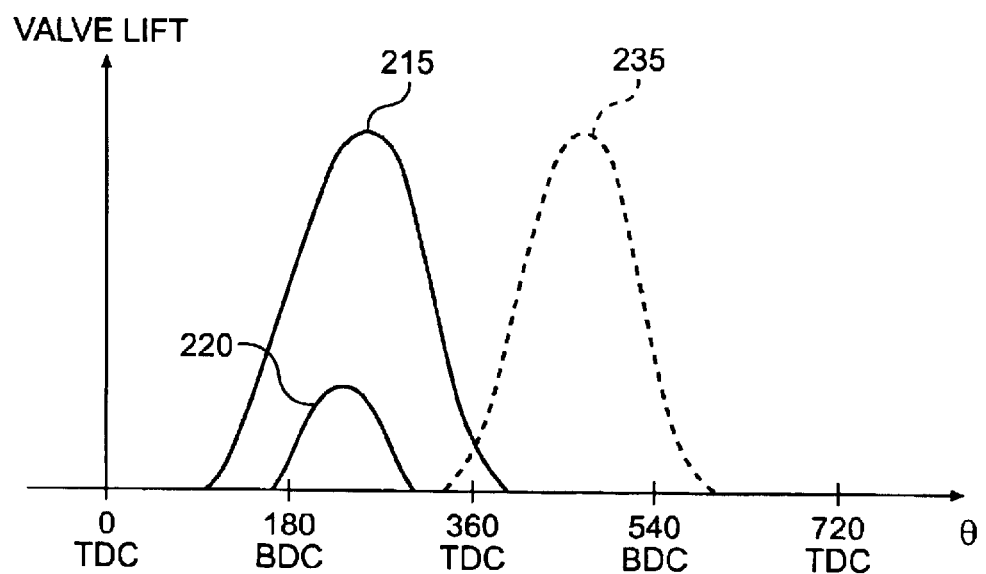
FIG. 4 is a valve lift profile according to an embodiment of the present invention illustrating actuation of one or more engine intake valves during the exhaust stroke.

In another embodiment of the present invention, the valve actuator 300 actuates one or more engine intake valves to produce an EGR event 220 during the main exhaust event 215, as shown in FIG. 4. A portion of the combustion gases are directed by the exhaust stroke from the engine cylinder (combustion chamber) through the engine intake port to the intake manifold. Some of those gases are then reintroduced into the engine cylinder with inlet air during the main intake event.

The precise opening and closing times of the engine intake valve(s) (duration of the EGR event 220) are controlled by the controller 400 and are preferably determined based on the pressure differential across the intake valve(s). The controller 400 receives input from the appropriate engine component and inputs a signal to the valve actuator 300. In response to the signal, the valve actuator 300 may switch to the motion transfer mode and actuate the intake valve(s). Higher cylinder pressure (opening the intake valve for the EGR event earlier, closer to the expansion stroke) will allow more exhaust gas to be trapped in the intake port and/or manifold for recirculation, but may result in reduced expansion power (lost work). The closing time for the valve may occur before the engine cylinder pressure drops below the intake manifold pressure, to prevent the recirculated gas from immediately escaping back into the engine cylinder. The precise opening and closing times of the engine intake valve may vary depending on system requirements. The valve lift profile shown in FIG. 4 is for illustrative purposes only. As will be apparent to those of ordinary skill in the art, the size, shape, and timing of the EGR event 220 may vary depending on a variety of factors, including, but not limited to, engine cylinder pressure, intake manifold pressure, the lash between the valve actuator 300 and the valves 200, the relative sizes (or hydraulic ratio) between the various components of the valve actuator 300, and/or any other modification of the motion provided by the motion imparting means 100.

Figure 6:
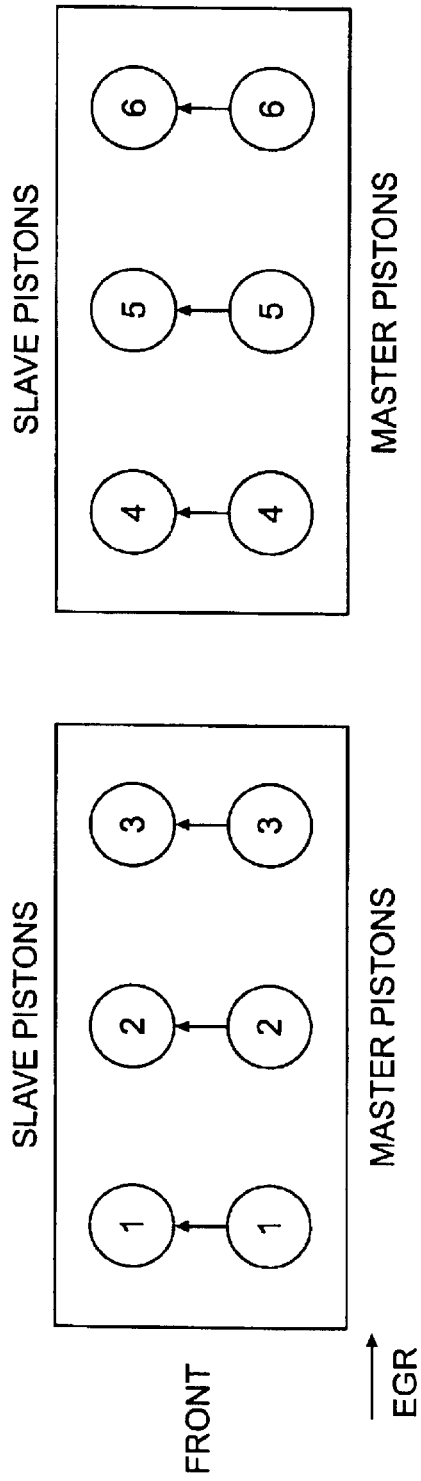
FIG. 6 is an operating schematic diagram of master and slave piston pairing according to an embodiment of the present invention.
Figure 7:
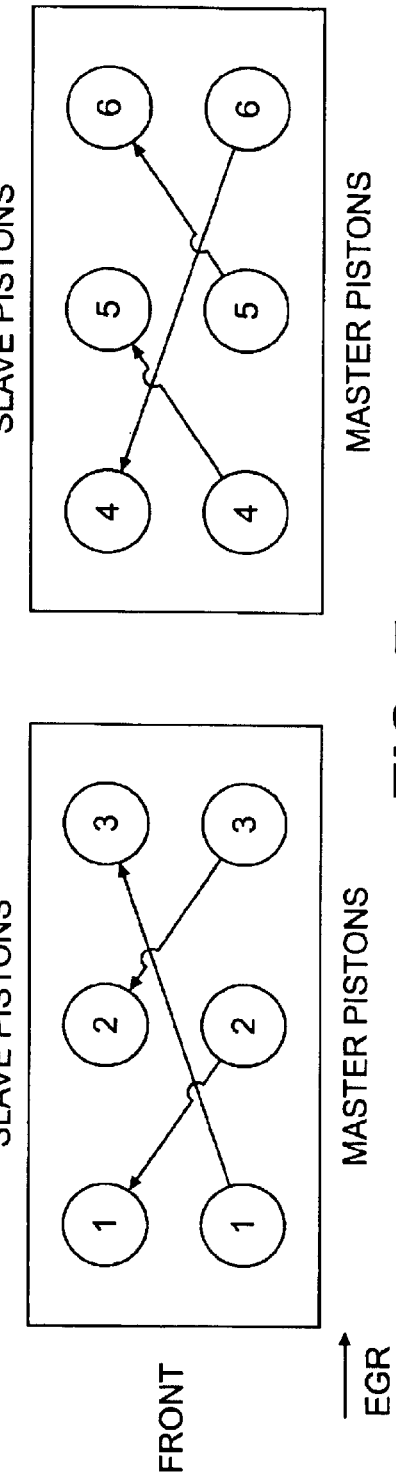
FIG. 7 is an operating schematic diagram of master and slave piston pairing according to another embodiment of the present invention.

FIGS. 6 and 7 depict examples of the relationships between the components of the valve actuator 300 to provide an exhaust gas recirculation valve event. In one embodiment of the present invention, as shown in FIG. 6, the master piston assembly 310 and the slave piston assembly 320 may act on engine valves associated with the same cylinder. For example, the master piston assembly 310 may receive motion from the intake cam for cylinder one (1). This motion would then be transferred to the slave piston assembly 320 for actuating an engine valve in cylinder one (1). Alternatively, the master piston assembly 310 and the slave piston assembly 320 may act relative to different cylinders, as shown in FIG. 7. For example, the master piston assembly 310 may receive motion from the intake cam for cylinder one (1). This motion would then be transferred to the slave piston assembly 320 for actuating an engine valve in cylinder three (3). It is contemplated that various embodiments of the present invention may provide any cross-cylinder actuation arrangement adapted to provide the appropriate timing of the EGR event.

Embodiments of the present invention may be adapted to utilize exhaust gas pulses produced in the exhaust manifold by one engine cylinder to facilitate the introduction of the recirculated gas into another engine cylinder at a desired time. For example, the gas pulses may be used to introduce the recirculated gas into an engine cylinder during the main intake event. These gas pulses may be utilized in engines having split, and non-split, exhaust manifolds. Tables 1 and 2 below illustrate example operating scenarios for utilizing the exhaust gas pulses for split manifold and non-split manifold engines, respectively.

TABLE 1

EGR - Split Manifold

| Cylinder Having EGR Event | Cylinder Providing Exhaust Gas Pulse |
|---|---|
| 1 | 3 |
| 2 | 1 |
| 3 | 2 |
| 4 | 5 |
| 5 | 6 |
| 6 | 4 |

TABLE 2

EGR - Non-Split Manifold

| Cylinder Having EGR Event | Cylinder Providing Exhaust Gas Pulse |
|---|---|
| 1 | 3 & 6 |
| 2 | 1 & 5 |
| 3 | 2 & 4 |
| 4 | 5 & 3 |
| 5 | 6 & 2 |
| 6 | 4 & 1 |

Figure 8:
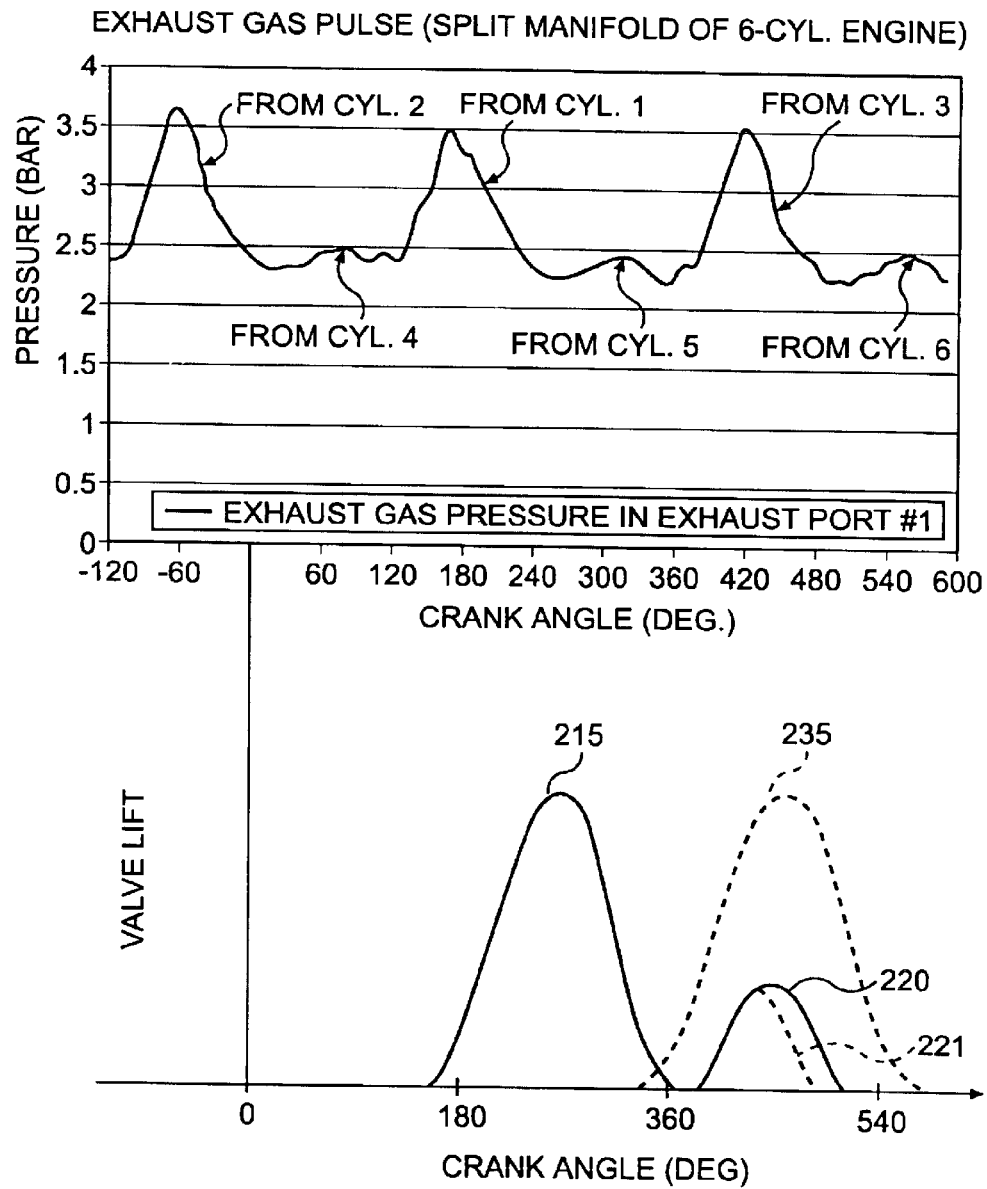
FIG. 8 is an exhaust gas pulse diagram and corresponding valve lift profile according to an embodiment of the present invention.

FIG. 8 is a sample exhaust gas pulse diagram illustrating the pressure in the exhaust port of cylinder no. 1 for a six (6) cylinder engine with a split manifold, and a corresponding valve lift profile for the engine valves of cylinder no. 1. If an EGR event 220 is desired during the main intake event 235, the recirculated gas may be introduced into the engine cylinder during the crank angle range of approximately 360 degrees to approximately 500 degrees. As shown in FIG. 8, cylinder no. 3 and cylinder no. 6 provide pulses during this range. The pulse from cylinder no. 6 originates in the other bank of the split manifold, and, accordingly, does not provide the necessary pressure to drive the EGR event. The pulse from cylinder no. 3, however, provides a higher pressure than the cylinder pressure in cylinder no. 1 at that time, and, thus, facilitates the introduction of the recirculated gas into the cylinder. The exhaust ports in other cylinders may experience similar exhaust gas pulse diagrams, and may utilize the appropriate gas pulse, as shown in Table 1 above.

The motion imparted to the valve actuator 300 to produce the EGR event 220 may be modified such that the closing time for the engine valve may occur before the engine cylinder pressure is greater than the exhaust manifold pressure, in order to prevent the recirculated gas from immediately escaping back into the exhaust manifold. This is illustrated by the modified EGR event 221. The valve lift profile shown in FIG. 8 is for illustrative purposes only. As will be apparent to those of ordinary skill in the art, the size, shape, and timing of the EGR event 221 may vary depending on the means used for modifying the motion imparted to the valve actuator 300, including, but not limited to, the lash between the valve actuator 300 and the valves 200, the relative sizes (or hydraulic ratio) between the various components of the valve actuator 300, the valve lift clipping mechanism, the reset mechanism, and/or any other modification of the motion provided by the motion imparting means 100.

For engines having non-split manifolds, the pulse from the other bank of the exhaust manifold may also have a sufficient pressure to drive the EGR event. As such, the pulse from cylinder #3 and/or cylinder #6 may be used to drive the EGR event. The exhaust ports in other cylinders in the non-split manifold may experience similar exhaust gas pulse diagrams, and may utilize the appropriate gas pulse(s), as shown in Table 2 above.

Figure 9:
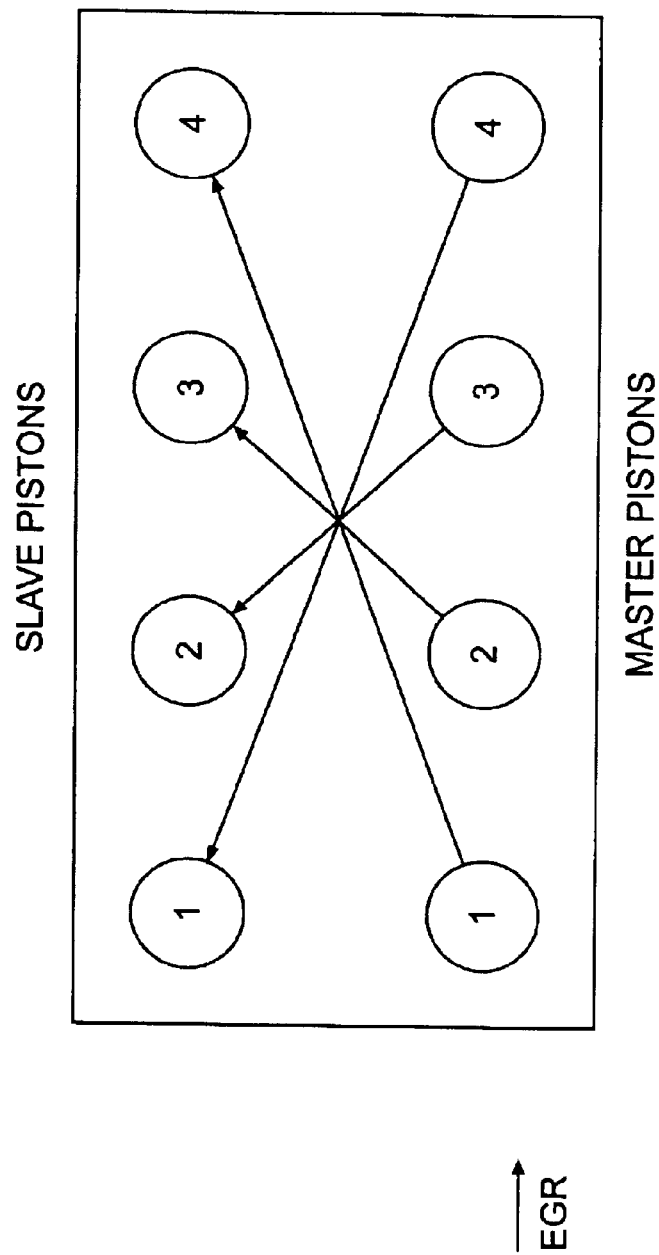
FIG. 9 is an operating schematic diagram of master and slave piston pairing according to an embodiment of the present invention for a four (4) cylinder engine.

For purpose of illustration, various embodiments of the present invention will be described for use in a six (6) cylinder engine. It is contemplated, however, that various embodiments of the present invention may be used with engines having any cylinder arrangements or numbers. For example, embodiments of the present invention may be adapted for use with a four (4) cylinder engine. As discussed above in relation to a six (6) cylinder engine, embodiments of the present invention for use with a four cylinder engine may employ cross-cylinder actuation arrangements. For example, in an embodiment shown in FIG. 9, a four cylinder engine having a 1-3-4-2 firing order may have a 1-4, 2-3, 3-2, 4-1 cross-cylinder actuation arrangement.

Figure 11:
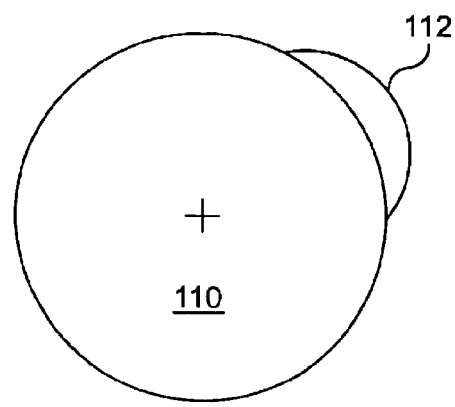
FIG. 11 is a cam that may be used in conjunction with the valve actuation system shown in FIG. 10.

A third embodiment of the valve actuation system 10 of the present invention will now be described with reference to FIG. 10. With reference thereto, valve actuator 300 comprises a bolt-on internal EGR system. The valve actuator 300 receives motion from the motion imparting means 100. The motion imparting means 100 may include an intake cam 110 having one or more cam lobes for producing an engine valve event. In one embodiment, as shown in FIG. 11, the intake cam includes a main intake event lobe 112. As discussed above, the motion imparting means 100 may comprise any combination of cam(s), push tube(s), and/or rocker arm(s), or their equivalents, necessary to impart motion to the valve actuator 300.

With continued reference to FIG. 10, the valve actuator 300 may comprise a master piston assembly 310 slidably disposed in a first bore 311 formed in a housing 302 such that it may slide back and forth in the bore while maintaining a hydraulic seal with the housing 302. The valve actuator 300 may further include a slave piston assembly 320 disposed in a second bore 321 formed in the housing 302 such that it may slide back and forth in the bore while maintaining a hydraulic seal with the housing 302. The slave piston assembly 320 is in fluid communication with the master piston assembly 310 through a hydraulic passage 304 formed in the housing 302. The slave piston assembly 320 is disposed above a sliding pin 330. In one embodiment, as shown in FIG. 10 an EGR lash, Z, exists between the slave piston assembly 320 and the sliding pin 330. Alternatively, the slave piston assembly 320 may be in contact with the sliding pin 330.

The valve actuator 300 is operatively connected to means 315 for supplying hydraulic fluid to the valve actuator 300. The supply means 315 is adapted to control the supply of hydraulic fluid to and from the hydraulic passage 304, and, correspondingly, may switch the valve actuator 300 between modes of transferring, and not transferring, the motion input from the cam 110 based on a signal received from the controller 400. In one embodiment, the supply means 315 comprises a fluid supply source, and one or more control valves (not shown). The one or more control valves may be selectively switched between modes of communicating, and not communicating, hydraulic fluid from the source to the hydraulic passage 304. As discussed above, it is contemplated that the supply means 315 may include any combination of devices necessary for supplying hydraulic fluid to and from the valve actuator 300.

The motion from the cam 110 is transferred to the master piston assembly 310, which, in turn, transfers the motion through hydraulic pressure in the passage 304 to the slave piston assembly 320. The hydraulic pressure causes the slave piston assembly 320 to translate in a downward direction and act on the sliding pin 330. This, in turn, causes the sliding pin 330 to act on a single valve 200, or on multiple valves 200 through a valve bridge 250 (as shown in FIG. 10) to produce an EGR event.

With continued reference to FIG. 10, the valve actuation system 10 may further comprise an engine braking system 500. The engine braking system 500 may be integrated into an exhaust rocker 510. The exhaust rocker 510 may include a central opening 505 for receipt of a rocker shaft, and a hydraulic braking passage 515 formed therein. The rocker arm 510 is adapted to pivot back and forth about the central opening 505. The exhaust rocker 510 may further include a bore 530 for receipt of the sliding pin 330. The braking system 500 may further include a braking piston assembly 520 disposed in a bore formed in the exhaust rocker 510. The braking piston assembly 520 is in communication with the braking passage 515. As will be apparent to those of ordinary skill in the art, the engine braking system 500 may be adapted to provide compression release braking or bleeder braking based on the motion input by a motion imparting force, such as, for example, an exhaust cam (not shown).

In one embodiment, the sliding pin 330 may further comprise a rocker contact surface 334, and a foot 336 for contacting the valve bridge 250. As shown in FIG. 10, a braking lash, L, may be formed between the exhaust rocker 510 and the rocker contact surface 334.

During engine braking, an engine braking lobe on the exhaust cam may cause hydraulic pressure to act on the braking piston assembly 520. This, in turn, may cause the braking piston assembly 520 to act on an exhaust valve 200 through a braking pin 540, producing an engine braking valve event. As the exhaust cam continues to rotate, the motion imparted by a main exhaust event lobe causes the exhaust rocker 510 to rotate about the central opening 605 such that the braking lash, L, is taken up. This causes the exhaust rocker 510 to contact the rocker contacting surface 334, and actuate one or more engine valves 200 to produce a main exhaust event. Similarly, during positive power operation, the exhaust cam causes the exhaust rocker 510 to rotate about the central opening 505, contact the rocker contacting surface 334, and actuate one or more engine valves 200 to produce a main exhaust event. Accordingly, the valve actuator 300 may operate independent of the braking system 500. In addition, the EGR lash, Z, may be independent of the braking lash, L.

The slave piston assembly 320 may include a slave piston spring 324 disposed in the housing 302 at the base of the slave piston assembly 320. The spring 324 biases the slave piston assembly 320 upward in the bore 321, away from the engine valves 200. When the exhaust rocker 510 contacts the sliding pin 330 and actuates the engine valves 200, the slave piston assembly 320 is separated from the sliding pin 330. The spring 324 holds the slave piston assembly 320 up against any low hydraulic pressure in the passage 304 originating from the supply means 315 that may be acting on the piston. This prevents the slave piston assembly 320 from "jacking," a condition which can cause damage to the system.

Figure 12:
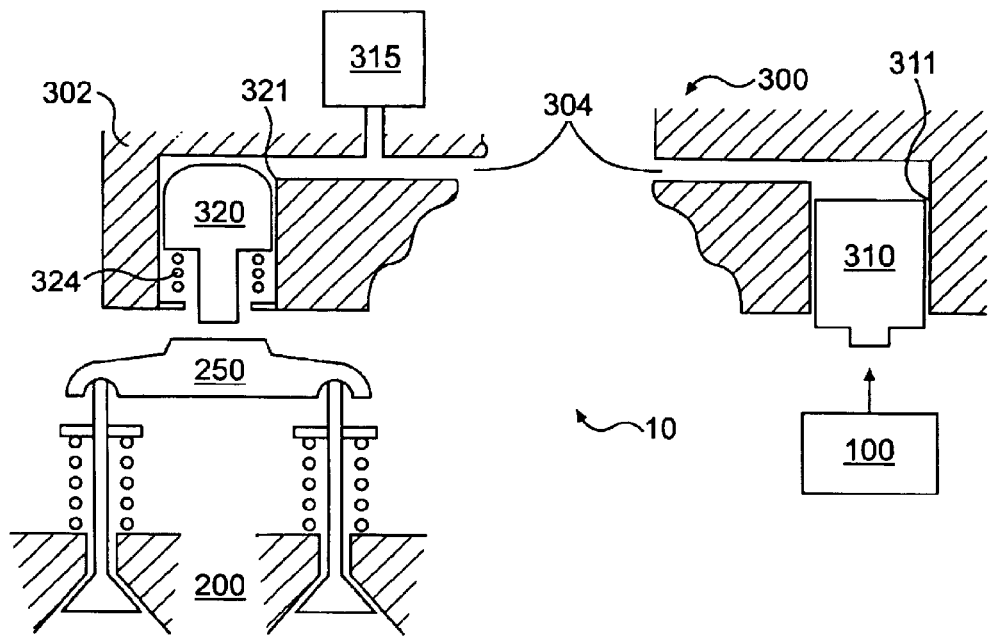
FIG. 12 is a valve actuation system according to a fourth embodiment of the present invention.

In another embodiment of the present invention, as shown in FIG. 12, the valve actuator 300 may actuate one or more intake valves 200 to produce an EGR event during a main exhaust event. In this embodiment, the motion imparting means 100 may include an exhaust cam 110 having a main exhaust lobe 112. The slave piston assembly 320 may be adapted to act directly on single engine valve 200, or on multiple engine valves 200 through the valve bridge 250, as shown. Alternatively, the slave piston assembly 320 may be adapted to act on an intake rocker (not shown), causing the rocker, in turn, to actuate the valve(s) 200.

Figure 13:
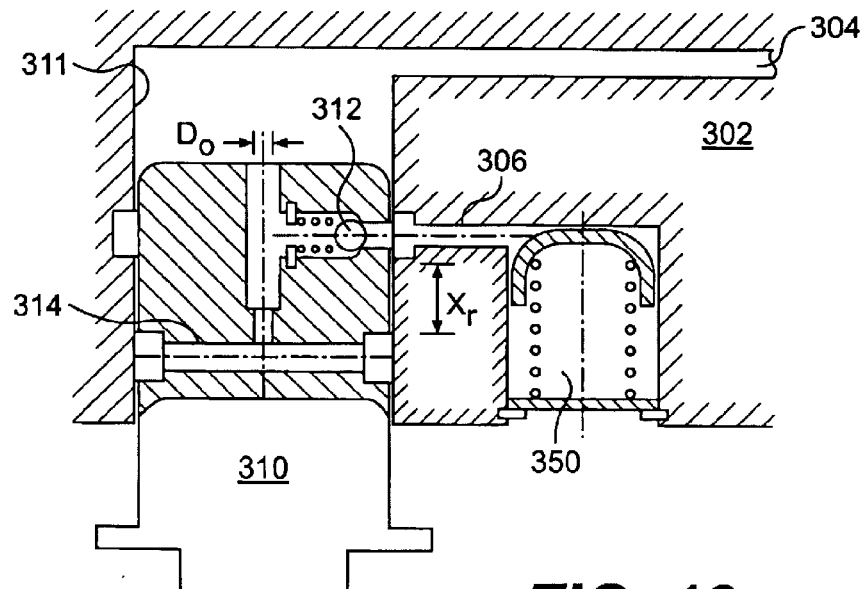
FIG. 13 is a first embodiment of a valve lift clipping mechanism that may be used in conjunction with the valve actuation system of the present invention.

The valve actuator 300 may further comprise means for modifying the motion input by the motion imparting means 100 in order to provide the required EGR valve event closing time. In one embodiment, as shown in FIG. 13, the valve actuator 300 further comprises a clip passage 314 formed within the master piston assembly 310, and a check valve 312 disposed within the master piston assembly 310. The clip passage 314 is in communication with the master piston bore 311 and the passage 304. An accumulator piston 350 is disposed within a bore formed in the housing 302. When the cam 110 is at base circle, as shown in FIG. 13, the master piston assembly 310 is at its lowest position. In this position, the check valve 312 is aligned with a release passage 306 formed within the housing 302. The opening of the clip passage 314 and the opening of the release passage 306 are separated by a variable distance $X_r$, as shown in FIG. 13.

The valve actuator 300 operates as described above. As the cam 110 rotates from base circle, it transfers motion to the master piston assembly 310, which in turn transfers the motion through hydraulic pressure in the passage 304 to the slave piston assembly 320. The hydraulic pressure causes the slave piston assembly 320 to translate in a downward direction, and act on the sliding pin 330 (if provided), which, in turn, actuates the engine valves 200.

Figure 14:
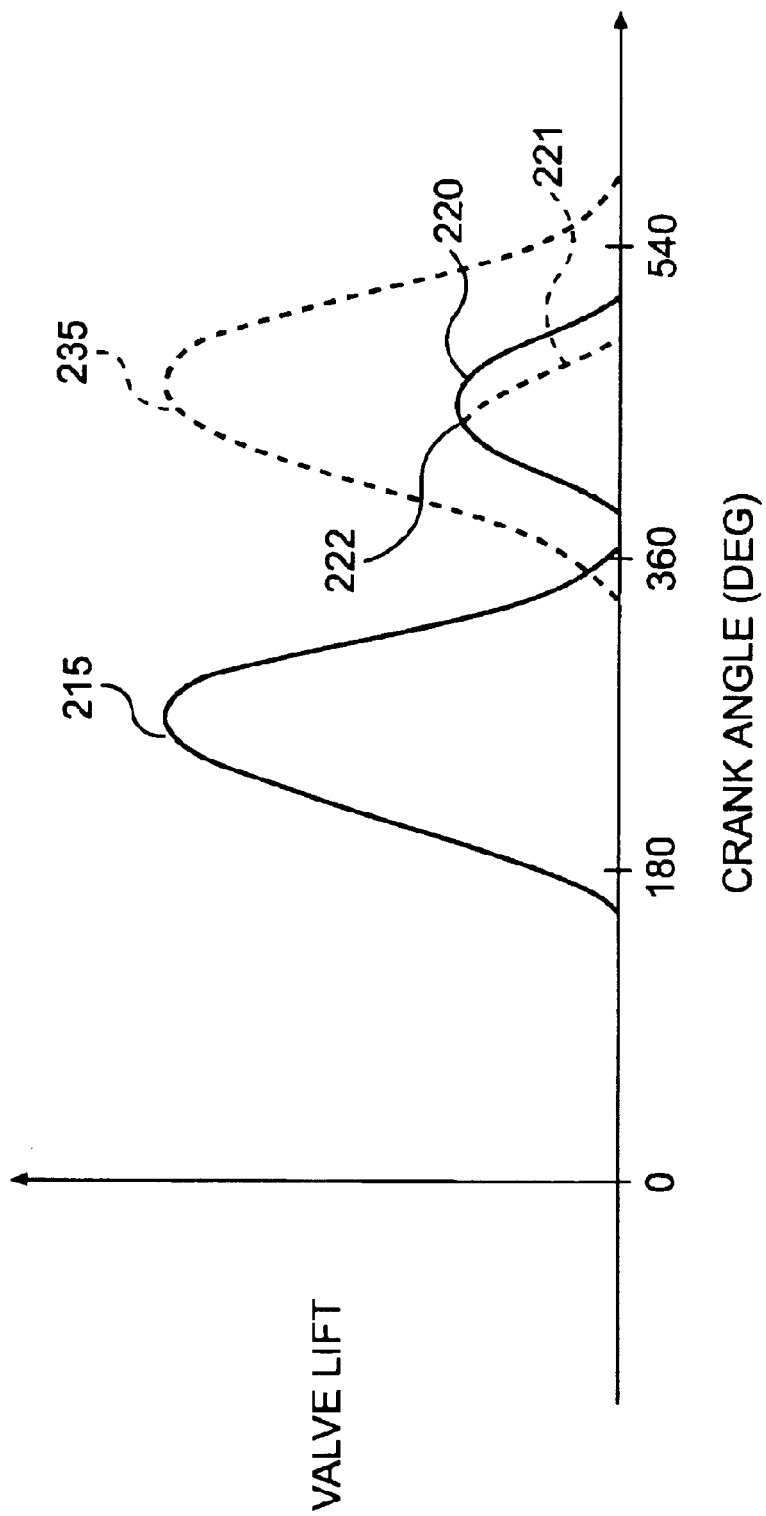
FIG. 14 is a valve lift profile with a modified EGR valve event according to an embodiment of the present invention.

When the master piston assembly 310 travels a distance $X_r$ within the bore 311, the clip passage 314 is exposed to the release passage 306. A portion of the hydraulic fluid in the passage 304 is now released through the release passage 306 and into an accumulator piston 350. This reduces the pressure in the passage 304 and causes the slave piston assembly 320 to retract, under the bias of the spring 324 and the valve springs. With the slave piston assembly 320 no longer acting on the engine valves 200, the valves close earlier. This results in a shortened, or "clipped," EGR valve event 221, as shown by the dashed lines in FIG. 14. The valve lift profile shown in FIG. 14 is exemplary only, and it is contemplated that the exact timing of the valve closing, and, correspondingly, the duration of the EGR event may vary. For example, the size and location of the release passage 306 may be adapted to modify the duration of the EGR valve event 221.

When the master piston assembly 310 returns from its peak lift to its lowest position at the base circle of the cam, the check valve 312 is aligned with the release passage 306. The fluid in the accumulator piston 350 is permitted to flow through the check valve 312, into the master piston bore 311 and the passage 304. Rather than releasing the fluid overboard and requiring a constant supply of fluid to the system, this arrangement promotes fluid re-use. This may reduce the need for make-up fluid for the system and may reduce "foaming" in the system fluid.

Figure 15A:
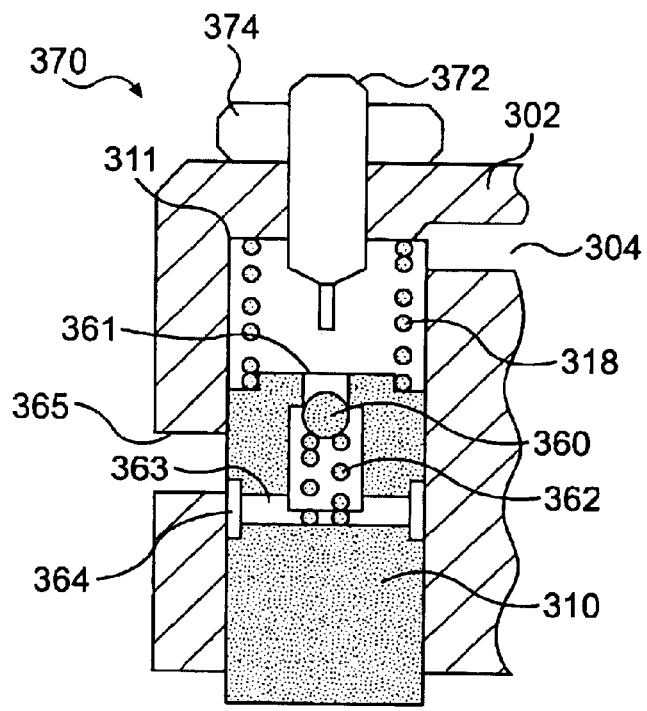
FIGS. 15a and 15b illustrate a second embodiment of a valve lift clipping mechanism that may be used in conjunction with the valve actuation system of the present invention.
Figure 15B:
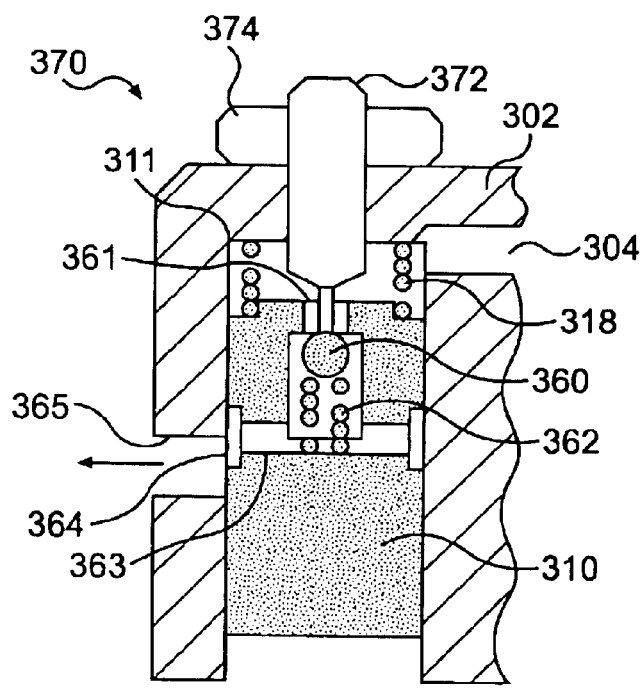

Another embodiment of the valve actuator 300 is shown with reference to FIGS. 15a and 15b, in which like reference characters refer to like elements. The master piston 310 includes a check valve assembly disposed therein. The check valve assembly includes a ball 360 and a spring 362. The spring 362 biases the ball 360 against its seat, covering a clip hole 361 formed in the master piston 310. The spring 362 may be sized such that hydraulic pressure above the master piston 310 will not unseat the ball 360. Alternatively, the spring 362 may be sized such that the ball 360 is unseated at a desired pressure. An annular detent 364 may be provided in the outer wall of the master piston 310, and may be in communication with a passage 363 formed in the master piston 310. The annular detent 364 may be in selective communication with a dump port 306.

A clip adjustment assembly 370 may be provided above the master piston 310. The clip adjustment assembly 370 includes a plunger 372 extending through the housing 302 into the master piston bore 311, and a locking screw 374. The locking screw 374 may be adjusted to extend the plunger 372 a desired distance within the bore 311. A master piston spring 318 biases the master piston 310 away from the plunger 372.

The embodiment of the present invention shown in FIGS. 15a and 15b may be operated as follows to modify the motion input by the motion imparting means 100 in order to provide the required EGR valve event closing time. During operation, low-pressure hydraulic fluid is supplied to the passage 304. Fluid flows through the passage 304 to the terminus of the passage at the master piston bore 311. When the cam 110 is at base circle, the master piston 310 attains its lower most position in the master piston bore 311. At this point, the annular detent 364 may not register with the dump port 365. As motion is imparted to the master piston 310, the master piston 310 moves upward within the bore 311. The master piston motion is transferred through the hydraulic pressure in the passage 304 to the slave piston 320. This causes the slave piston 320 to translate in a downward direction, resulting in actuation of the engine valve 200.

With reference to FIG. 15b, as the master piston 310 continues upward translation within the master piston bore 311, the tip of the plunger 372 contacts the ball 360 and unseats it from the clip hole 361. At this point the annular detent 364 is registered with the dump port 365. High pressure fluid above the master piston 310 and in the passage 304 flows through the uncovered clip hole 361 and the passage 363, and is vented through the dump port 366. The fluid may be dumped overboard, back to the supply means 315, or to an accumulator.

The venting of fluid through the dump port 365 reduces the pressure in the hydraulic passage 304, causing the slave piston 320 to retract under the bias of the spring 324 and/or the valve springs. With the slave piston 320 no longer acting on the engine valve(s) 200, the valve(s) close earlier. With reference to FIG. 14, this results in a shortened, or clipped, EGR valve event 221. The point 222 at which the imparted motion is modified may vary. The locking screw 374 may be loosened or tightened to adjust the position of the plunger 272 and the corresponding clip height.

Figure 16A:
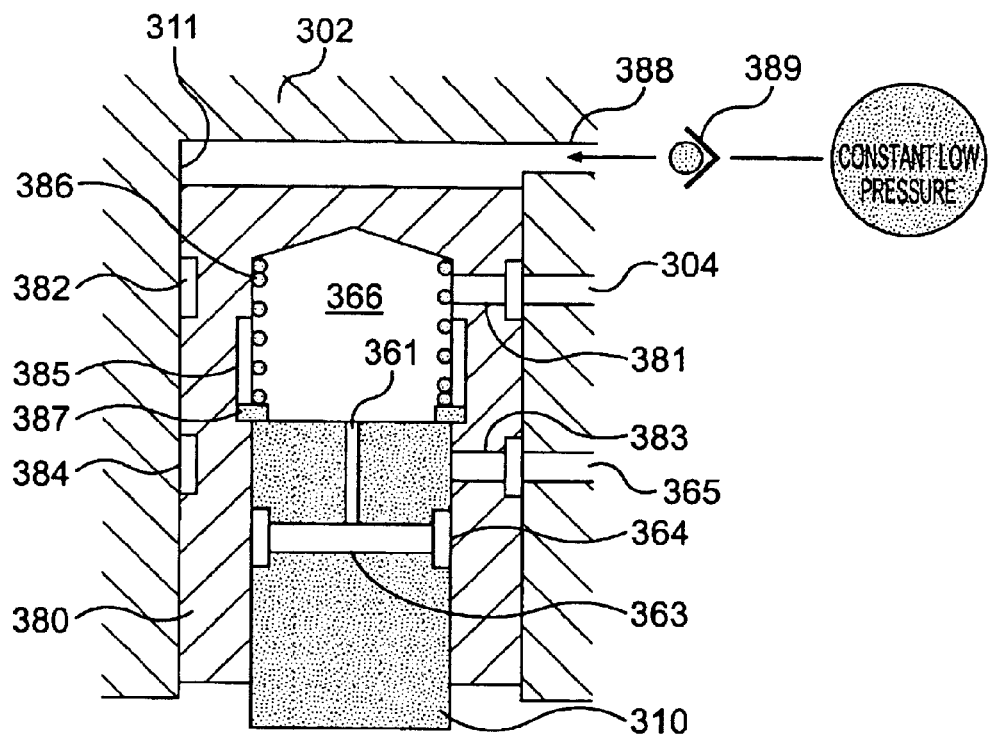
FIGS. 16a and 16b illustrate a third embodiment of a valve lift clipping mechanism that may be used in conjunction with the valve actuation system of the present invention.
Figure 16B:
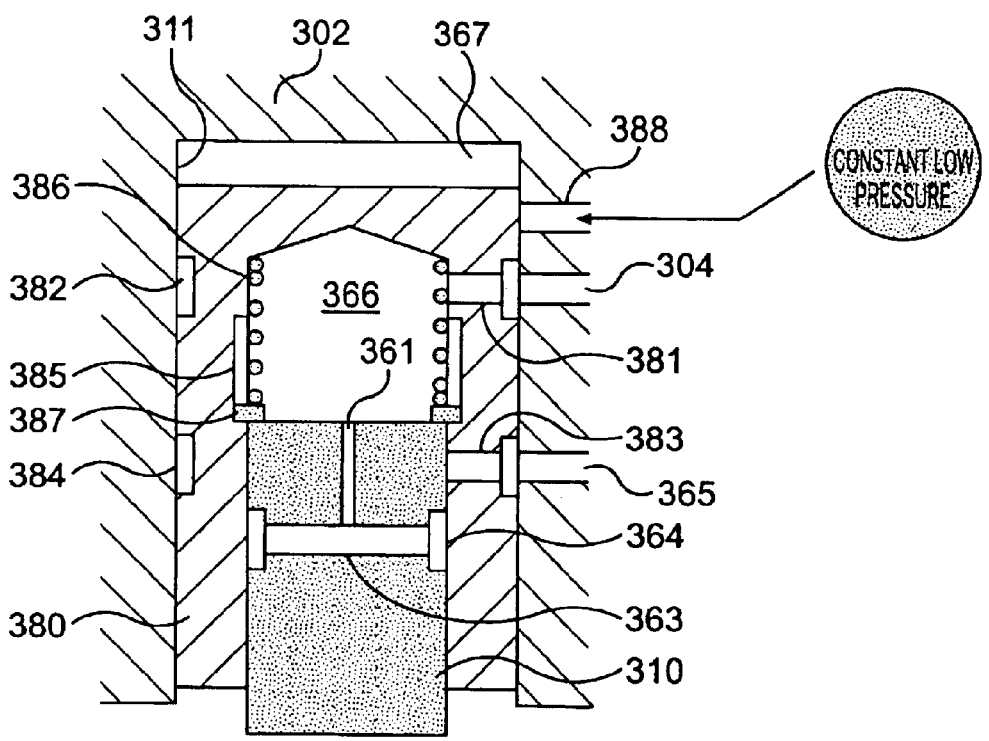

Another embodiment of the valve actuator 300 is shown with reference to FIGS. 16a and 16b, in which like reference characters refer to like elements. The valve actuator 300 includes a master piston sleeve 380 slidably disposed in the master piston bore 311. A first annular detent 384 and a second annular detent 382 may be provided in the outer wall of the sleeve 380, and a retaining groove 385 may be provided in the inner wall of the sleeve 380. A supply passage 381 formed in the sleeve 380 is aligned with the annular detent 382, and a clip passage 383 formed in the sleeve 380 is aligned with the annular detent 384.

The master piston 310 is slidably disposed in a cavity 366 in the sleeve 380. A retaining ring 387 is slidably disposed in the retaining groove 385. A spring 386 has a first end in contact with the sleeve 380 and a second end in contact with the retaining ring 387. The spring 386 biases the retaining ring 387 in a downward direction against the master piston 310.

A lash passage 388 may be provided in the housing 302. The lash passage 388 may terminate at the top of the master piston bore 311 at a position above the passage 304. The lash passage 388 connects to a constant low pressure hydraulic fluid supply, as shown in FIG. 16a. A check valve 389 may be disposed in the lash passage 388 so as to primarily allow only one-way fluid flow from the lash passage 388 to the master piston bore 311.

The embodiment of the present invention shown in FIG. 16a may be operated as follows to modify the motion input by the motion imparting means 100 in order to provide the required EGR valve event closing time. The constant low pressure fluid supply biases the sleeve 380 and the master piston 310 in a downward direction in the bore 311. Because the force of the spring 386 is greater than that produced by the low-pressure above the sleeve, the sleeve 380 and the master piston 310 move together. The sleeve 380 and the master piston 310 are biased downward until the master piston 311 contacts the motion imparting means 100, taking up lash in the system. As shown in FIG. 16a, in this position, the annular detent 382 registers with the passage 304, and the annular detent 384 registers with the dump port 365.

During operation, low-pressure fluid is supplied to the passage 304. Fluid flows through the passage 304 to the cavity 366 through the annular detent 382 and the supply passage 381. As motion is imparted to the master piston 310, the master piston 310 moves upward within the cavity 366. The fluid in the lash passage 388 above the sleeve 380 cannot escape at this point because the check valve 389 does not permit fluid to flow back towards the low pressure supply. As a result, the sleeve 380 is hydraulically locked relative to the master piston 310 and does not move.

The master piston motion is transferred through the hydraulic pressure in the passage 304 to the slave piston 320. This causes the slave piston 320 to translate in a downward direction, resulting in actuation of the engine valve 200. The master piston 310 continues upward translation within the master piston bore 311 until the master piston annular detent 364 registers with the sleeve annular detent 384 and the dump port 365. High pressure fluid in the 366 and in the passage 304 flows through the clip hole 361 and the passage 363, and is vented through the dump port 365. The fluid may be dumped overboard, back to the low pressure supply, or to an accumulator.

The venting of fluid through the dump port 365 reduces the pressure in the hydraulic passage 304, causing the slave piston 320 to retract under the bias of the spring 324 and/or the valve springs. With the slave piston 320 no longer acting on the engine valve(s) 200, the valve(s) close earlier. With reference to FIG. 14, this results in a shortened, or clipped, EGR valve event 221.

With reference to FIG. 16b, in which like reference characters refer to like elements, the valve actuator 300 provides the lash mechanism in a slightly different manner from the system shown in FIG. 16a. The lash passage 388 terminates at the master piston bore 311 at a location above the passage 304, but not at the top of the bore 311. Low-pressure fluid is supplied through the lash passage 388 to a lash cavity 367 above the sleeve 380. The fluid may slowly fill the lash cavity 367 by way of clearance between the master piston 310 and the master piston bore 311. The fluid in the lash cavity 367 biases the sleeve 380 and the master piston 310 in a downward direction in the bore 311, taking up lash in the system. When the system is turned off, the fluid in the cavity 367 may slowly leak out of the master piston bore 311. The system shown in FIG. 16b may operate as described above in connection with the system shown in FIG. 16a to provide the required EGR valve event closing time.

Figure 17A:
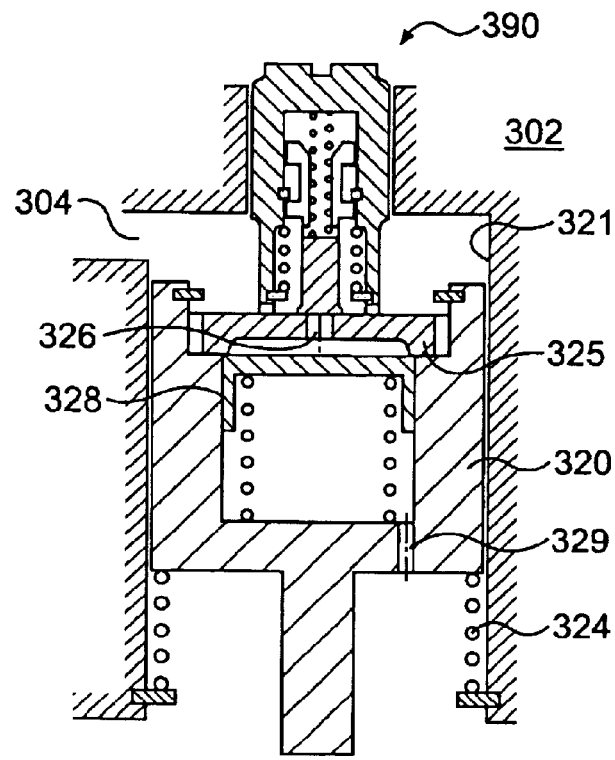
FIGS. 17a and 17b illustrate a slave piston reset mechanism that may be used in conjunction with the valve actuation system of the present invention.
Figure 17B:
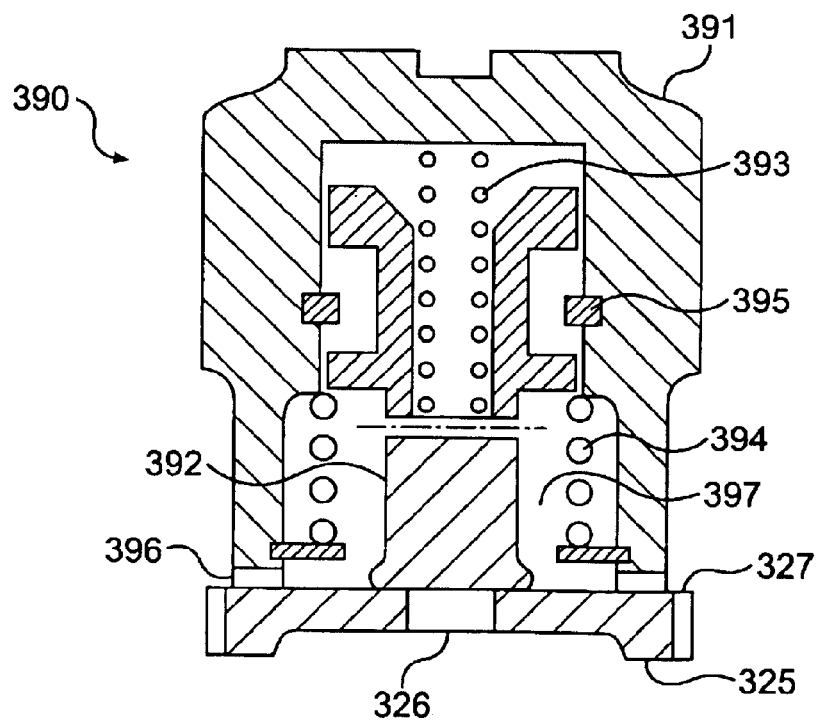

Another embodiment of the valve actuator 300 is shown with reference to FIGS. 17a and 17b, in which like reference characters refer to like elements. The valve actuator 300 may include a reset device 390 disposed in the housing 302. The reset device 390 extends into the slave piston bore 321 above the slave piston 320. A sealing plate 325 having a bleed hole 326 formed therein is disposed above the slave piston 320. The slave piston 320 may include an accumulator 328 and a pressure relief hole 329 formed therein.

With reference to FIG. 17b, the reset device 390 includes a housing 391 adapted to be adjustably disposed in the housing 302, and a reset plunger 392. An upper spring 393 biases the reset plunger 392 in a downward direction against the sealing plate 325. A foot of the plunger 392 covers the bleed hole 326. A lower spring 394 rests on the housing 391.

The embodiment of the present invention shown in FIGS. 17a and 17b may be operated as follows to modify the motion imparted to the valve actuator 300 in order to provide the required EGR valve event closing time. When the master piston 320 is on the cam base circle and no motion is being transferred to the slave piston 320, the slave piston is biased in an upward direction against the sealing plate 325 and the reset device 390 by the slave piston spring 324. The plunger 392 is biased against the sealing plate 325 by the upper spring 393, covering the bleed hole 326. As motion is imparted to the master piston 310, the master piston 310 moves in an upward direction, and pressurizes hydraulic fluid in the passage 304. The master piston motion is transferred through the hydraulic pressure in the passage 304 to the slave piston 320. The hydraulic fluid enters the slave piston bore 321 and acts on the slave piston 320 and the sealing plate 325. The hydraulic fluid may enter the space 397 between the housing 391 and the sealing plate 325 via an annular groove 396 formed in the housing 391. As the hydraulic fluid begins to push the slave piston 320 and the sealing plate 325 downward, the plunger 392 follows under the bias of the upper spring 393. As the plunger 392 moves down, the plunger 392 contacts the lower spring 394. The combination of the force of the upper spring 393 and the hydraulic pressure acting on the plunger 392 is sufficient to overcome the force of the lower spring 394. Accordingly, the foot of the plunger 392 continues to travel downward and maintain a seal with the bleed hole 326.

The plunger 392 continues to follow the downward motion of the slave piston 320 until the plunger 392 hits a stop 395 formed in the housing 391, and begins to separate from the sealing plate 325. The hydraulic pressure acting on the plunger 392 is reduced. At this point, the force of the lower spring 394 is sufficient to overcome the force of the upper spring 393 and any remaining hydraulic pressure acting on the plunger 392. The lower spring 394 forces the plunger 392 upward to its initial position, opening the bleed hole 326. The high-pressure fluid from the passage 304 is now dumped into the accumulator 328 through the bleed hole 326. The combination of the accumulator 328 and the pressure relief hole 329 absorbs the motion provided by the master piston 310. Because the high-pressure fluid is no longer acting on the slave piston 320, the slave piston 320 retracts within the slave piston bore 321 under the bias of the slave piston spring 324 or the valve springs. With the slave piston 320 no longer acting on the engine valve(s) 200, the valve(s) close earlier. With reference to FIG. 14, this results in a shortened EGR valve event 221.

The accumulator 328 allows the dumped oil to be refilled back into the slave piston bore 321 through the bleed hole 326. An annular groove formed in the sealing plate 325 may facilitate the return of fluid to the bore 321. It is contemplated that the slave piston 310 may be provided without the accumulator, such that the high-pressure fluid dumps directly through the pressure relief hole 329.

Figure 18A:
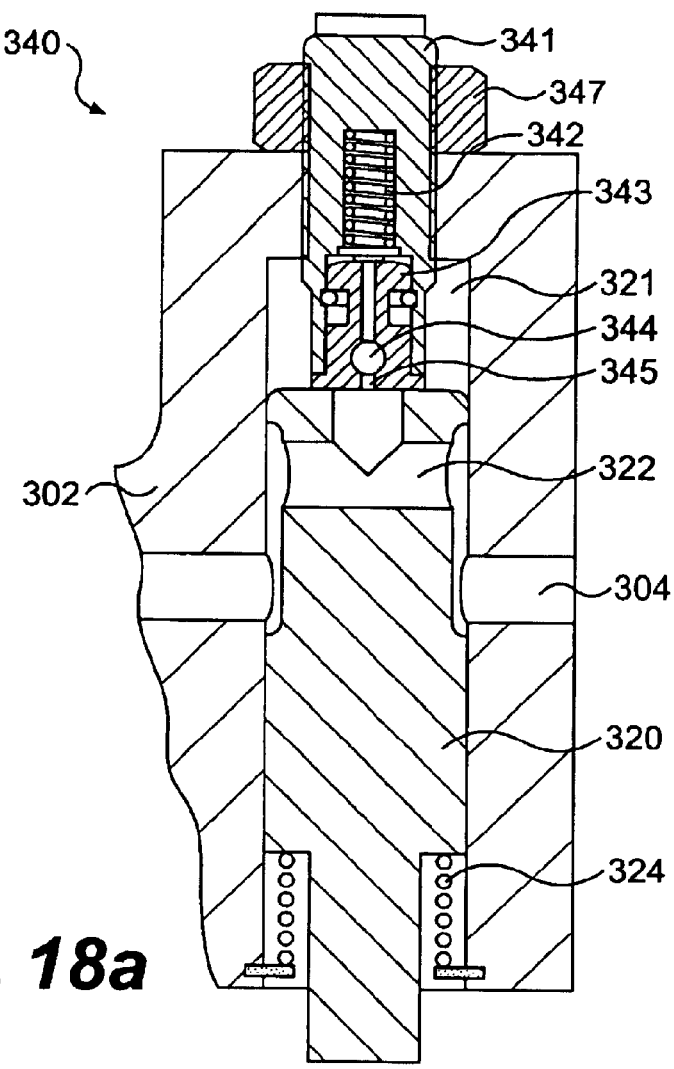
FIG. 18a is a schematic diagram of a prior art valve catch assembly.

In alternative embodiments, the valve actuator 300 may further comprise a means for controlling the seating velocity 340 of the engine valves 200 (valve catch assembly). In one embodiment of the present invention, as shown in FIG. 18a, the valve catch assembly 340 comprises a valve catch body 341 disposed in the housing 302 above the slave piston assembly 320 such that a portion of the body 341 extends into the slave piston bore 321. The valve catch assembly 340 further comprises a valve catch plunger 343 disposed within the body 341, and a valve catch spring 342 having a first end in contact with the plunger 343 and a second end in contact with the body 341. A cross passage 344 having an orientation substantially orthogonal to the orientation of the slave piston bore 321 is formed in the valve catch plunger 343. The cross passage 344 is in communication with the slave piston bore 321. A bleed passage 345 having an orientation substantially parallel to the orientation of the slave piston bore 321 is formed in the valve catch plunger 343 and is in communication with the cross passage 344. The size of the bleed passage 345 is adapted such that the flow of fluid entering the bleed passage 345 from either the plenum 322 or the slave piston bore 321 is restricted.

With continued reference to FIG. 18a, the slave piston assembly 320 may further comprise a plenum 322 formed therein. The plenum 322 is in communication with the passage 304 and the slave piston bore 321. The plunger 343 is biased by the spring 342 into the slave piston bore 321. The slave piston assembly 320 is biased by the slave piston spring 324 in an upward direction within the slave piston bore 321, away from the engine valves 200. When no fluid pressure is acting on the slave piston assembly 320, the slave piston assembly 320 is forced against the plunger 343 because the bias of the slave piston spring 324 is greater than the spring 342. In this position, the plunger 343 blocks the plenum 322 from communicating with the slave piston bore 321, but places the plenum 322 in communication with the bleed passage 345. The outer edge of the plunger 343, in turn, is forced against the body 341, as shown in FIG. 18a.

Operation of the valve catch assembly 340 shown in FIG. 18a will now be described. As the master piston assembly 310 is pushed up by the motion of the cam 110, high pressure hydraulic fluid flows to the slave piston assembly 320 through the fluid passage 304 and into the plenum 322. Because the plunger 343 may not retract into the body 341, the slave piston assembly 320 is temporarily held against the plunger 343. As such, the fluid flows from the plenum 322 through the bleed passage 345 and into the cross passage 344. From the cross passage 344, the fluid is then emptied into the slave piston bore 321. The pressure created by the fluid in the slave piston bore 321 acts on the top of the slave piston assembly 320, causing it to begin to translate in a downward direction. The plunger 343 follows the slave piston assembly 320 for a set distance and then separates from it. Once the slave piston assembly 320 is separated from the plunger 343, fluid is released from the plenum 322 into the bore 321 more easily, creating additional pressure which acts on the top of the slave piston assembly 320. The slave piston assembly 320 follows the motion of the master piston assembly 310 and translates downward in the bore 321, causing the actuation of the engine valves 200, as described above.

As the engine valves 200 begin to reseat, the slave piston assembly 320 moves in an upward direction within the bore 321. The fluid in the bore flows through the passage 304 until the slave piston assembly 320 hits the plunger 343. At this point, the continued upward translation of the slave piston assembly 320 forces the fluid in the bore 321 through the bleed passage 345 and the cross hole 344. The small size of the bleed passage 345, however, restricts the flow of the hydraulic fluid leaving the bore 321. The pressure caused by this restricted flow acts to slow down the engine valve 200 as it reseats.

Because the plunger may not retract into the body 341, the slave piston assembly 320 may not separate from the plunger 343 until a sufficient amount of hydraulic pressure is released through the bleed passage 345 and the cross passage 344. Because the bleed passage 345 is small relative to the plenum 322, the pressure necessary to cause the separation may not occur immediately. Accordingly, the slave piston assembly 320 may not follow the motion of the master piston assembly 310 until a high pressure is built up in the plenum 322. When this occurs, the high pressure may cause a very rapid initial downward displacement of the slave piston assembly 320 before the slave piston assumes the more gradual motion of the master piston assembly 310. This uneven motion of the slave piston assembly 320 may lead to a non-smooth valve lift for the engine valve 200.

Figure 18B:
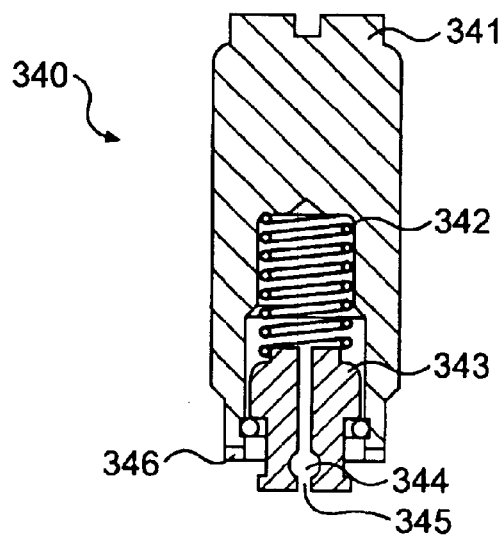
FIG. 18b is a schematic diagram of an improved means for reducing the seating velocity of an engine valve that may be used in conjunction with the valve actuation system of the present invention.

With reference to FIG. 18b, in which like reference numerals refer to like elements from FIG. 18a, a preferred embodiment of the valve catch assembly 340 will now be described. The valve catch assembly 340 further comprises a slot 346 formed within the body 341. The plunger 343 remains biased by the spring 342, extending from the opening of the body 341, however, the plunger 343 is adapted to recede into the body 341. Thus, when no fluid pressure is acting on the slave piston assembly 320, the slave piston assembly 320 is held directly against the body 341. When additional pressure acts on it, the plunger 343 may retreat into the body 341 beyond the slot 346.

Operation of the valve catch assembly 340 shown in FIG. 18b will now be described. As described above, the motion of the master piston 310 causes high pressure hydraulic fluid to flow to the slave piston assembly 320 through the fluid passage 304 and into the plenum 322. The high pressure flow causes the plunger to recede into the body 341 beyond the slot 346. The high pressure flow may then act on a greater surface area of the top of the slave piston assembly 320, leading to an earlier separation from the body 341, and allowing the slave piston 320 to follow the initial master piston motion. This generates a smooth valve lift profile for the EGR valve event.

It will be apparent to those skilled in the art that variations and modifications of the present invention can be made without departing from the scope or spirit of the invention. For example, it is contemplated that embodiments of the master piston assembly 310, the slave piston assembly 320, and the valve catch assembly 340 may be adapted for use together or separately. In addition, embodiments of the master piston assembly 310, the slave piston assembly 320, and the valve catch assembly 340 may be used in conjunction with other valve actuation systems, such as, for example, an engine braking system. Thus, it is intended that the present invention cover all such modifications and variations of the invention, provided they come within the scope of the appended claims and their equivalents.

What is claimed is:

1. A method of providing exhaust gas recirculation (EGR) in a multi-cylinder engine, each engine cylinder having at least one engine valve, intake and exhaust manifolds, and a valve actuator, said method comprising the steps of:
    imparting motion to the valve actuator;
    actuating the engine valve of a first engine cylinder responsive to the imparted motion;
    determining a first and a second engine parameter level;
    modifying the imparted motion responsive to the level of the first engine parameter level and the second engine parameter level to produce an exhaust gas recirculation event.

2. The method of claim 1, wherein the step of modifying the imparted motion further comprises the step of closing the engine valve before the second engine parameter level exceeds the first engine parameter level.

3. The method of claim 2, wherein the engine valve comprises an exhaust valve.

4. The method of claim 3, wherein the first engine parameter value comprises exhaust manifold pressure, and the second engine parameter value comprises engine cylinder pressure.

5. The method of claim 2, wherein the engine valve comprises an intake valve.

6. The method of claim 5, wherein the first engine parameter value comprises engine cylinder pressure, and the second engine parameter value comprises intake manifold pressure.

7. The method of claim 1, wherein the step of imparting motion further comprises the step of imparting motion corresponding to a main valve event of a second engine cylinder.

8. The method of claim 7, wherein the main valve event comprises a main intake event.

9. The method of claim 1, wherein the step of modifying the imparted motion further comprises the step of utilizing an exhaust gas pulse from a second engine cylinder to facilitate the recirculation of gas into the first engine cylinder.

10. The method of claim 9, wherein the exhaust manifold comprises a split exhaust manifold.

11. The method of claim 1, wherein the step of modifying the imparted motion further comprises the step of utilizing an exhaust gas pulse from one of a second engine cylinder or a third engine cylinder to facilitate the recirculation of gas into the first engine cylinder.

12. The method of claim 11, wherein the exhaust manifold comprises a non-split exhaust manifold.

13. A system for providing exhaust gas recirculation (EGR) in a multi-cylinder engine having a housing, each engine cylinder having at least one engine valve, and intake and exhaust manifolds, said system comprising:
    an EGR housing disposed on the engine housing, said EGR housing having an hydraulic passage formed therein;
    means for actuating the engine valve of a first engine cylinder;
    means for imparting motion to said valve actuation means; and
    means for modifying the motion imparted to said valve actuation means to produce an EGR event having an early valve closing time.

14. The system of claim 13, wherein said valve actuation means comprises:
    a master piston assembly slidably disposed in a first bore formed in said EGR housing; and
    a slave piston assembly slidably disposed in a second bore formed in said EGR housing, said piston assembly in communication with the master piston assembly through the hydraulic passage.

15. The system of claim 14, wherein said motion modifying means is disposed in said master piston assembly.

16. The system of claim 14, wherein said motion modifying means is disposed in said slave piston assembly.

17. The system of claim 13, wherein the imparted motion corresponds to a main valve event of a second engine cylinder.

18. The system of claim 17, wherein the main valve event comprises a main intake event.

* * * * *